US008850424B2

(12) United States Patent (10) Patent No.: US 8,850,424 B2
Friedman et al. (45) Date of Patent: Sep. 30, 2014

(54) PROCESSING, MODIFICATION, DISTRIBUTION OF INSTALLATION PACKAGES

(75) Inventors: Robert U Friedman, Westborough, MA (US); Cimarron Buser, Wellesely Hills, MA (US)

(73) Assignee: Apperian, Inc., Boston, MA (US)

( * ) Notice: Subject to any disclaimer, the term of this patent is extended or adjusted under 35 U.S.C. 154(b) by 41 days.

(21) Appl. No.: 13/462,457

(22) Filed: May 2, 2012

(65) Prior Publication Data

US 2012/0284704 A1 Nov. 8, 2012

Related U.S. Application Data

(60) Provisional application No. 61/482,359, filed on May 4, 2011.

(51) Int. Cl.
*G06F 9/445* (2006.01)

(52) U.S. Cl.
CPC ........................................ *G06F 8/61* (2013.01)
USPC ............ 717/177; 717/170; 717/175; 717/176

(58) Field of Classification Search
None
See application file for complete search history.

(56) References Cited

U.S. PATENT DOCUMENTS

| 2009/0144727 | A1* | 6/2009 | Felts ............................. 717/175 |
| 2010/0083284 | A1* | 4/2010 | Onsen ........................... 719/321 |
| 2011/0016461 | A1* | 1/2011 | Bankston et al. ............. 717/170 |
| 2013/0047150 | A1* | 2/2013 | Malasky et al. ............... 717/176 |

OTHER PUBLICATIONS

International Search Report mailed Jul. 3, 2012 in corresponding International Application No. PCT/US2012/036135.

* cited by examiner

*Primary Examiner* — Don Wong
*Assistant Examiner* — Roberto E Luna
(74) *Attorney, Agent, or Firm* — Chapin IP Law, LLC

(57) ABSTRACT

According to example configurations, a customization engine receives a default installation package. The installation package supports installation of a respective application to a computing device. The customization engine further receives a set of rules indicating at least one alteration to be applied to the received installation package to transform the received installation package into a customized installation package. The customization engine further receives a set of data to be applied according to the rules. The customization engine modifies the received default installation package in accordance with the set of rules and supplied data to produce the customized installation package.

35 Claims, 10 Drawing Sheets

PROCESSING, MODIFICATION, DISTRIBUTION OF INSTALLATION PACKAGES

RELATED APPLICATIONS

This application is related to and claims the benefit of earlier filed U.S. Provisional Patent Application Ser. No. 61/482,359 entitled "Systems and Methods for Application Customization, Distribution and Installation," filed on May 4, 2011, the entire teachings of which are incorporated herein by this reference.

BACKGROUND

In many instances, computer software is delivered with an installer program that unpacks and installs an installation package onto a computer device. Computer devices typically include the ability to retrieve and execute an installer program to download and install software applications to the computer device.

An installation package produced by a developer can include any software resources that are needed to execute a respective application on the computer. For example, software source code produced by a developer is typically written in a high level language not understood by a computer device. The source code is compiled into executable code (e.g., machine code understood by the computer). The executable code is typically included in an installation package for downloading to the computer.

In addition to including the executable code, the installation package can include extra digital assets (e.g., configuration files, image files, etc.) enabling proper execution of the application on the computer device.

Subsequent to installation of appropriate software to the computer device, a user is then able to execute the application in accordance with input from a user.

Via copying and distribution of the same default installation package to different sites, multiple users can install an application according to default settings for execution on different computer devices. Thus, conventional installation can include installation of an application in accordance with default settings as specified by the installation package.

BRIEF DESCRIPTION OF DIFFERENT EMBODIMENTS

Conventional applications as discussed above suffer from a number of deficiencies. For example, as discussed above, each of multiple users can receive the same conventional installation package for installation of a respective application to his/her computer. Subsequent to installing the application, and because the installed application and configuration information is the same for each user, each user must then configure the application to operate in a desired manner if they would like to deviate from using the default settings. Also, software which is not bespoke typically looks the same to all users, and lacks any branding or look and feel that is specific to the recipient.

Configuring a newly installed application can be tedious and time-consuming, especially for computer users that are not computer savvy. Configuration by a user may require many hours of aggravation if the user is not accustomed to providing such information. Thus, the individual and/or cumulative amount of effort to configure the application on multiple computers can be substantial.

Embodiments herein deviate with respect to conventional techniques. For example, one embodiment herein includes a novel technique of producing customized installation packages for use by one or more different end users, machines, etc. As further described below, customization can include branding, configuring settings, etc.

More specifically, according to one embodiment, a processing resource such as a customization engine receives an installation package facilitating installation of respective software application to a computer device. By way of a non-limiting example, the installation package received by the customization engine can be configured in accordance with default or standard settings.

In one embodiment, the installation package received by the customization engine includes both compiled information and non-compiled information. For example, a received installation package can include compiled executable code derived from source code. The received installation package can further include software resources (e.g., non-compiled information) used by the compiled executable code or operating system of a target device to carry out functions associated with the application.

In accordance with one embodiment, in addition to receiving the installation package, the customization engine as discussed herein receives a set of rules (e.g., one or more rules, modification information, etc.) indicating one or more alterations to be applied to the received installation package. The alterations, when applied by the customization engine to the received installation package, transform the received installation package (e.g., default package) into a customized installation package. For example, in accordance with the set of rules (e.g., instructions), the customization engine modifies the received installation package to produce a customized installation package.

As its name suggests, the customized installation package produced by the customization engine enables a respective computer device to download and install a customized application to a target computer device instead of a default application. Customization of the installation package alleviates the user of the computer device from having to configure all settings of the application since the customized installation package performs settings on behalf of the user of the computer device, and provides some customization to the appearance of the application.

The ability to generate different customized installation packages from a single default installation package can be particularly useful in multiple-user organizations in which a network administrator must otherwise configure each of multiple applications for end users in the organization. For example, instead of each user having to configure a same application installed on a respective computer device, the customized installation package produced in accordance with rules provided by a network administrator is used to install an application in accordance with appropriate settings.

The one or more customized installation packages produced by the customization engine can be distributed to respective destination devices in a network environment. For example, in one embodiment, a mobile device receives a customized installation package and installs compiled executable code and corresponding modified software resources onto the mobile device. As mentioned, the modified software resources in the customized installation package customize the installed application for the intended recipient.

In accordance with embodiments herein, the installation package received by the customization engine can enable installation of a respective software application to a particular type of computing device amongst multiple different types of computing devices.

In further embodiments, the customization engine performs the modification such that the customized installation package derived from the received installation package does not need to be recompiled prior to distribution to a respective user. For example, as mentioned above, the received default or generic installation package can include compiled code derived from source code. The customization engine can include the original compiled code in the customized installation package such that the customized installation package includes the same set of compiled code as that found in the initially received installation package. Because there is no modification to the compiled code when producing the customized installation package, the customization engine or other processing resource need not perform recompilation when producing the customized installation package. A developer therefore does not need to release the source code to the party producing the customized installation packages. Thus, the customization engine as discussed herein allows customization without requiring that code be recompiled, that is, without requiring the developer to make any modifications.

Thus, embodiments herein can include: providing modification of a compiled software package without requiring code changes or recompilation of the received installation package; modifying software resources in the received installation package in accordance with the set of rules; and including the compiled executable code and the modified software resources in the customized installation package.

In certain instances, the customization engine can be configured to modify the compiled resources for inclusion in the customized installation package. Thus, the customized installation packages can include modified compiled resources as well as modified non-compiled resources from the received default installation package.

Via additional embodiments herein, different customized installation packages produced by the customization engine can be distributed to users handheld mobile computing devices in a wireless network. By way of a non-limiting example, the customized installation packages can be preconfigured with settings associated with a target user of the handheld mobile computing device. Thus, modification of a standard installation package into one or more customized installation packages alleviates the need for each of the end users to otherwise perform certain configuration tasks.

The set of rules of rules received by the customization engine can include a corresponding set of data. The set of rules can specify particular functions or commands (e.g., copy, edit, replace, delete, ... ) to be carried out with respect to the installation package customization process. In one embodiment, in accordance with instructions in the set of rules, the processing resource uses the set of data as specified by the rules to transform the received installation package into the customized installation package.

As an example, modifying the received installation package in accordance with the set of rules to produce the customized installation package can include, for each rule: obtaining an instruction from the set of rules, the instruction indicating how to modify a specified portion of the received installation package; executing the instruction to modify the specified portion; and including the modified portion of the received installation package in the customized application. Thus, a portion such as non-compiled resource information in the received default installation package can be modified and included in the customized installation package.

Further, in another embodiment, modifying the received installation package in accordance with the rule can include, for each rule: identifying a resource (target resource to which the rule is being applied) in the received installation package as specified by a rule; retrieving data from the set of data, the retrieved data specified by the rule; and in accordance with the rule, swapping the identified resource in the received installation package with the data to produce the customized software installation package. As further discussed herein, a developer (e.g., first party) of the software included in the default installation package can specify a rule and target resource to which the rule applies. A party such as a network administrator (e.g., second party) can provide the respective data for the rule to customize the target resource. As mentioned above, the installation package received by the customization engine can include multiple portions. At least one of the multiple portions in the received installation package can include original signature information derived from selected portions in the received installation package. In other words, a resource that produces the original installation package received by the customization engine can sign the original installation package with original signature information. The signature information is assigned to and included in the received default installation package.

After one or more modifications to non-compiled resource information in accordance with the set of rules, the customization engine can sign the customized installation package with new signature information. A certificate to sign the customized installation package can be produced by a valid certificate authority. In yet further embodiments, to collect the set of rules, a rules collection manager can be configured to distribute a graphical user interface from a web server to an entity at a remote location over a network. Via input to the graphical user interface at the remote location, the rules collection manager receives the set of rules and/or related data (i.e., customization information) from one or more parties. The customization engine uses the rules/data to convert a default installation package into one or more different customized installation packages.

As further described herein, the rules can be separated from corresponding data. In one more specific embodiment, the application supplier or developer would specify rules and potentially target resources to which they apply, while a recipient (e.g., party defining the customization) would supply corresponding data for the rules. The recipient (e.g., the customization engine or other resource) can choose to store the rules/data in any suitable manner.

Accordingly, embodiments herein further include: from a first party, receiving a given rule specifying a target resource in the received installation package; presenting the rule to a second party, the second party defining how to produce the customized installation package; receiving data associated with the given rule from the second party; producing the customized installation package to include a modification to the target resource as specified by the given rule and the received data.

Note that further embodiments herein can include, prior to customization, analyzing an installation package to identify compiled executable code versus related software resources present in the received installation package. The analysis can include determining which portions (e.g., non-compiled code) of a respective received installation package can be modified. Based on the analysis, a processing resource provides notification to an administrator of the presence of the different software resources in the received installation package.

A notification can indicate portions of the software resources that can be modified to produce a customized installation package. In one embodiment, the notification of the different software resources in the installation package enables the administrator to produce the set of rules that are to be used to produce the customized installation package. The customization engine receives the set of rules from the administrator and, as mentioned above, uses the set of rules to produce one or more customized installation packages.

These and other embodiments are discussed in more detail below.

As mentioned above, note that embodiments herein can include a configuration of one or more computerized devices, workstations, handheld or laptop computers, personal computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations as discussed herein. One such embodiment comprises a computer program product including a non-transitory computer-readable storage medium (i.e., any suitable computer readable hardware storage medium or media) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other medium such as firmware or microcode in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, one particular embodiment of the present disclosure is directed to a method and computer program product that includes a computer readable hardware storage medium having instructions stored thereon. For example, in one embodiment, the instructions, when executed by one or more processor devices in a computer system, cause a customization engine and/or other resources executing on one or more processor devices to: receive an installation package, the installation package enabling installation of a respective application to a computing device; receive a set of rules indicating at least one alteration to be applied to the received installation package to transform the received installation package into a customized installation package; and modify the received installation package in accordance with the set of rules to produce the customized installation package.

In one embodiment, an intermediary computer receives the default installation package, applies rules and data to create the customized package, and then delivers the customized package to the target computer device. In accordance with further embodiments, the target device can be configured to retrieve the customized installation package from an intermediary system.

The ordering of the steps has been added for clarity sake. These steps can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein can be embodied strictly as a software program, as a hybrid of software and hardware, or as hardware alone such as within a processor, or within an operating system or a within a software application.

Additionally, although each of the different features, techniques, configurations, etc., herein may be discussed in different places of this disclosure, it is intended that each of the concepts can be executed independently of each other or, where suitable, the concepts can be used in combination with each other. Accordingly, the one or more present inventions as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), and additional points of novelty, the reader is directed to the Detailed Description section and corresponding figures of the present disclosure as further discussed below.

Figure 1:
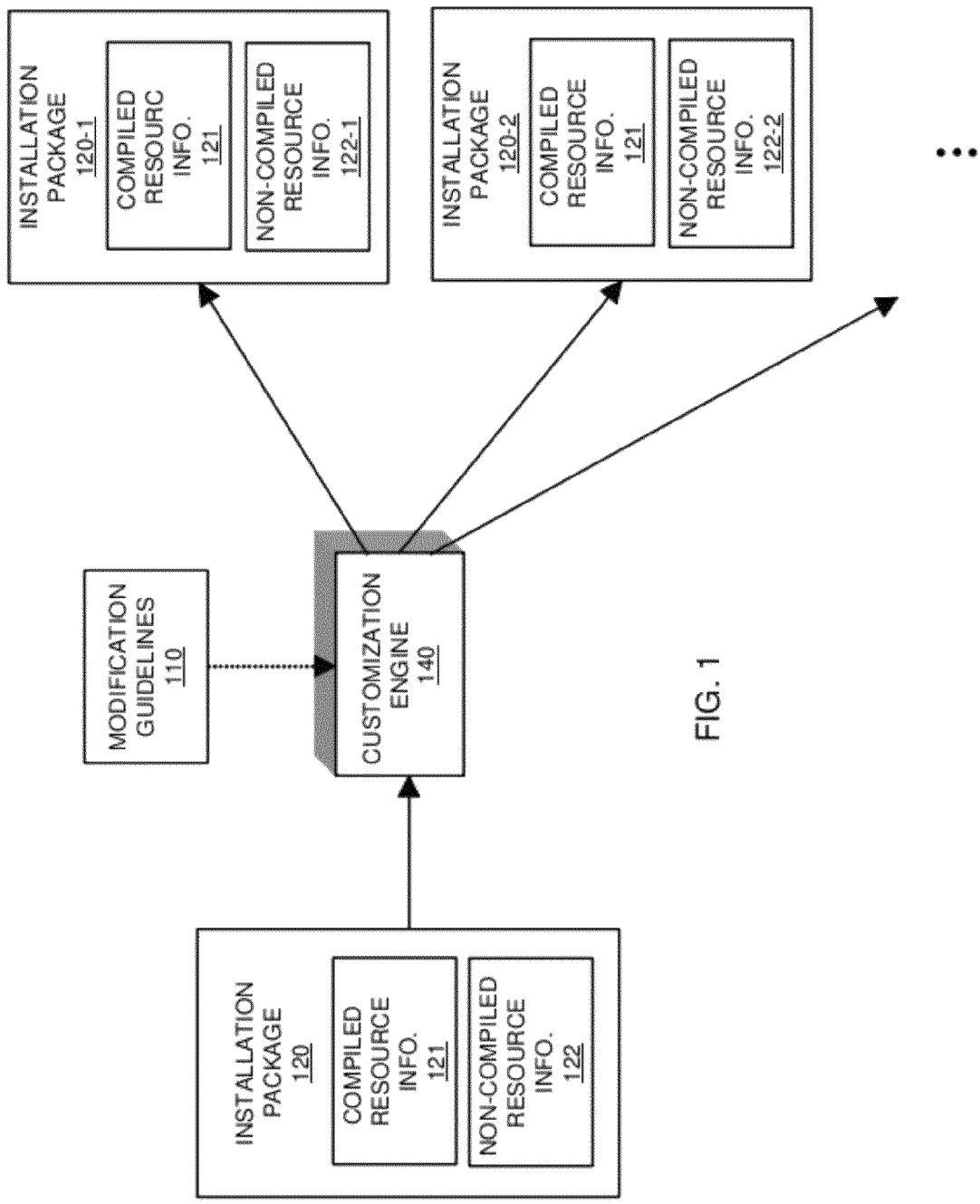
FIG. 1 is an example diagram illustrating generation of custom software installation packages according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to embodiments herein, a customization engine receives an installation package. The installation package can be a default installation package that supports installation of a respective application to a computing device. The customization engine further receives a set of rules indicating at least one alteration to be applied to the received installation package to transform the received installation package into a customized installation package. The customization engine modifies the received installation package in accordance with the set of rules to produce one or more different customized installation packages.

More specifically, FIG. 1 is an example diagram illustrating customization of a software installation package according to embodiments herein. The software installation package (e.g., installation package 120) can include any resources to facilitate installation of a respective software application onto a computer device such that a user is able to subsequently use the installed application of the computer device to perform one or more functions.

As shown, a processing resource such as a customization engine 140 receives installation package 120. By way of a non-limiting example, installation package 120 facilitates installation of a respective software application to a computer device.

In one embodiment, the installation package 120 includes both compiled resource information 121 and non-compiled resource information 122.

More specifically, installation package 120 includes compiled resource information 121 such as one or more machine-readable instructions derived from compiling corresponding source code. Installation package 120 can further include non-compiled resource information 122 such as files, configuration information, etc., used by the compiled instructions and/or operating system of a target computer device to carry out one or more different functions associated with the application when executed after installation.

In accordance with further embodiments, the installation package 120 may include an installer resource (e.g., executable instructions) facilitating installation of a respective application to a computer device.

As mentioned, by way of a non-limiting example, the received installation package 120 initially can be configured in accordance with default settings or default information such that a user receiving the installation package 120 can install a respective application on their computer device and use the application in accordance with the default settings. In other words, the installation package 120 can be configured for possible installation of an application to any suitable computer device that supports execution of the compiled resource information 121.

In accordance with conventional applications as discussed above, each of multiple users can receive the installation package 120 and install the same application to their computer devices. However, as mentioned, configuring an installed application can be tedious.

In contrast to conventional techniques, the customization engine 140 in FIG. 1 can be configured to customize the installation package 120 based on modification guidelines 110 such that the installed application is at least partially customized for use by a user on the computer device upon and/or subsequent to installation.

In accordance with one non-limiting example, the customization engine 140 modifies the installation package 120 to produce installation packages 120-1, 120-2, and so on. Each of the customized installation packages 120-1, 120-2, etc., can be customized for installation of an application to a respective target recipient to which the customized installation packages are subsequently distributed.

By further way of a non-limiting example, in one embodiment, customization engine 140 modifies only the non-compiled resource information 122 in the installation package 120 to produce installation packages 120-1, 120-2, etc. For example, the customization engine 140 produces installation package 120-1 to include to a copy of the compiled resource information 121 with no modifications. The customization engine 140 modifies non-compiled resource information 122 in accordance with modification guidelines 110 to produce non-compiled resource information 122-1 for inclusion in installation package 120-1.

Thus, the customized installation package 120-1 includes a non-modified portion (i.e., compiled resource information 121) of the installation package 120 and a modified or customized portion (i.e., non-compiled resource information 122) of the installation package 120.

If desired, note that the customization engine 140 also can be configured to modify the compiled resource information and include the modified compiled resource information in a respective customized installation package.

In this example, assume that the customization engine 140 produces installation package 120-2 to include to a copy of the compiled resource information 121 (with no modifications). The customization engine 140 modifies non-compiled resource information 122 in accordance with modification guidelines 110 to produce non-compiled resource information 122-2 for inclusion in installation package 120-2. Thus, the customized installation package 120-2 includes a non-modified portion (i.e., compiled resource information 121) of the installation package 120 and a modified or customized portion (i.e., non-compiled resource information 122) of the installation package 120.

As mentioned, each of the installation packages 120-1, 120-2, etc., produced by customization engine 140 can be targeted for use by to different users. For example, the installation package 120 can be customized to produce installation package 120-1 for a first user, installation package 120-1 can be customized to produce installation package 120-2 for a second user, and so on.

In accordance with yet further embodiments, customization can be performed on behalf of an individual or for a group such as a company. That is, in certain cases, it is desirable to customize an installation package at a company level as opposed to the individual user level. For example, the same customized installation package can be distributed to each of multiple mobile computer devices in the same organization. An IT (Information Technology) specialist of the organization can perform further customization after the customized application has been installed on a respective device.

Thus, modification guidelines 110 can be different for each targeted user or for a group of users.

As mentioned, modifying the non-compiled resource information is useful because it affords the ability to customize an application installed on a respective computer device. Thus, via customization provided by customization engine 140, a single application used by multiple different users can be customized and have a different look and feel for each user. As mentioned above, in one embodiment, the customization engine 140 does not need to recompile the source code since the compiled resource information 121 is not modified.

Note further that distribution can be a multistep process. For example, the customized applications can be available from an application store over a network. That is, the customized application can be available from an application store and then distributed to individuals that are members of the group such as employees having access to the application store. Customization as discussed herein can include customizing the installation packages at or around a time of delivering a requested application to a target user retrieving the customized installation package from the application store.

As mentioned above, note again that as an alternative to producing multiple customized installation packages from a received default installation package 120, the customization engine 140 can be configured to modify one or more portions of the received installation package 120 in accordance with modification guidelines 110 to produce a single installation package 120-1 for use by each of multiple target users that are members of an organization such as a company.

Figure 2:
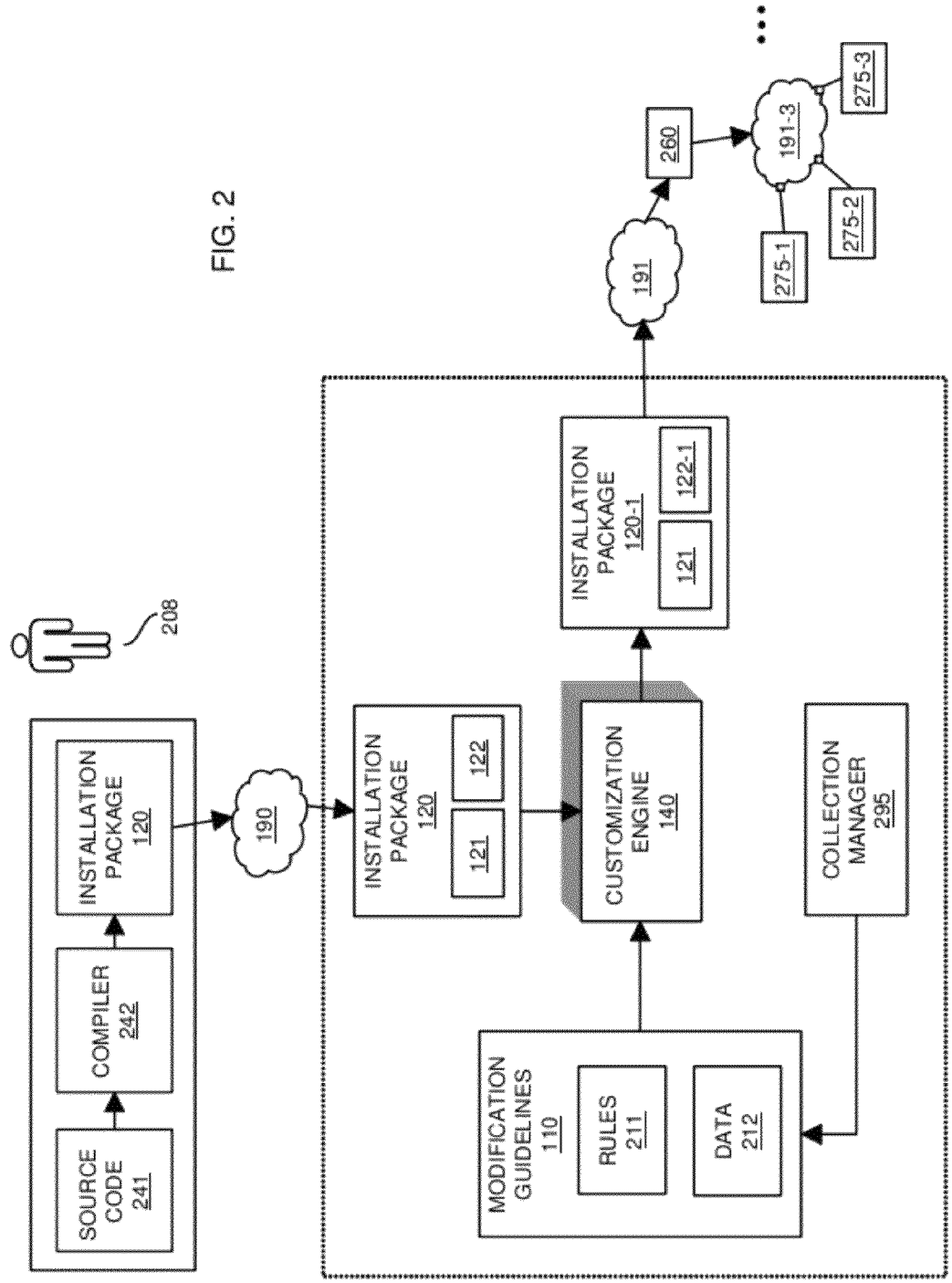
FIG. 2 is an example diagram illustrating customization and distribution of installation packages according to embodiments herein.

FIG. 2 is an example diagram illustrating an example environment for generating, distributing, and using customized installation packages according to embodiments herein.

As shown, developer 208 produces source code 241 associated with a respective software application. The developer 208 uses compiler 242 to compile the source code 241 into compiled resource information 121 (e.g., machine-readable instructions, etc.) for inclusion in installation package 120. As previously discussed, the installation package 120 can include compiled resource information 121 as well as any suitable non-compiled resource information 122.

The developer 208 or other suitable resources initiates distribution of the installation package 120 to a facility including customization engine 140.

Customization engine 140 receives installation package 120 from developer 208 or other entity in any suitable manner such as over network 190. The installation package 120 may be encrypted to prevent access and/or use by unauthorized users.

In addition to receiving the installation package 120, the customization engine as discussed herein can receive modification guidelines 110 such as a set of rules (e.g., instructions, commands, etc.) indicating one or more alterations to be applied to the received installation package 120.

The commands or rules 211, when applied by the customization engine 140, transform the received installation package 120 (e.g., an installation package with default settings) into a customized installation package 120-1. For example, in accordance with the set of rules 211 and corresponding data 212 in modification guidelines 110, the customization engine 140 modifies the received installation package 120 to produce the customized installation package 120-1.

As previously discussed, and as its name suggests, the customized installation package 120-1 produced by the customization engine 140 enables a respective recipient computer device to install a customized application. Customization of the installation package 120-1 (as opposed to distribution and use of the generic or default installation package 120) alleviates the target user of the computer device from having to configure all settings of the application since the customized installation package 120-1 performs at least some of the settings of the newly installed application on behalf of the user of the computer device or provides a customized look and feel, such as branding.

The ability to customize installation packages can be particularly useful in multiple-user organizations in which a network administrator must configure each of multiple applications on behalf of end users such as employees in the organization. Instead of each user or network administrator 260 having to configure a same installed application, a customized installation package received by the computer device installs an application in accordance with appropriate settings for the target user.

In accordance with a more general case, the customized installation package 120-1 can be configured in accordance with settings for an organization such as a corporation. The customization can include, for example, customizing an installation package 120-1 to include a URL (Uniform Resource Locator) and port number of a server associated with a company.

One or more customized installation packages 120-1, 120-2, etc., can be distributed to a network administrator 260 over network 191 by any suitable resource. As discussed below, in one embodiment, the network administrator 260 initiates further distribution of the customized installation packages to one or more target recipients.

For example, in one embodiment, the customized installation packages produced by customization engine 140 can be transmitted over a network 191 to a corresponding network administrator 260. The network administrator 260 of an organization, in turn, can further distribute the customized installation packages 120-1, 120-2, etc., to corresponding computer devices 275 or target users.

In this non-limiting example, assume that the network administrator 260 forwards customized installation package 120-1 over network 191-3 (e.g., a private or public network, wireless network, hardwired network, etc.) to computer device 275-1; network administrator 260 forwards customized installation package 120-2 over network 191-3 to computer device 275-2, and so on.

In accordance with yet further embodiments, if desired, the network administrator 260 can forward the same customized installation package 120-1 to each of recipients 275-1, 275-2, 275-3, etc.

One or more of the computer devices 275 can be mobile handheld devices used by respective employees to carry out employment tasks. For example, in one embodiment, the network administrator 260 provides the modification guidelines 110 to the customization engine 140 to create the customized installation packages.

Embodiments herein can further include a collection manager 295 to manage rules and data. The rules 211 and/or respective data 212 can be received and/or generated by any suitable one or more different resources.

In accordance with a specific embodiment, collection manager 295 can be located in a server coupled to network 191 and/or network 190.

To collect the set of rules 211 and/or data 212, the collection manager 295 can be configured to distribute one or more graphical user interfaces (e.g., information collection pages such as a web pages) to receive any portion of the modification guidelines 110 from remote resources. Thus, the network administrator 260 or other suitable resource can input any or all of the modification guidelines 110 to one or more web pages.

In one embodiment, the network administrator 260 specifies the rules and data to be used to produce the customized installation package 120. One way to receive the rules and data is a web interface. For example, the collection manager 295 can be configured to server a web page to network administrator 260. Via the web page, the network administrator specifies the rules 211 and data 212. As mentioned, the modification guidelines 110 are subsequently used by the customization engine 140 to convert a default installation package 120 into one or more different customized installation packages 120-1, 120-2, etc.

In an alternative embodiment, note that the developer (e.g., author, creator, etc.) of the application may be in the best position to identify attributes and/or parameters of the respective application that end users would like to customize. In such an instance, the developer 208 of the application that produces the source code 241 can specify a set of rules (without corresponding data) that are potentially applied to the default installation package 120 to produce one or more customized installation packages 120-1.

Each rule created by the developer 208 can enable modification of a corresponding target aspect of the application and/or non-compiled resource information 122-1 in the customized installation package 120-1.

As a more specific example, assume that a rule creator such as a developer 208 produces a first rule (e.g., instruction) enabling a respective network administrator to specify a network address from which to retrieve e-mails using the subsequently installed application. In such an instance, via the first rule created by the rule creator, the network administrator would provide the data (i.e., appropriate network address) that is to be used with the first rule. Upon execution of the first rule and data, the customization engine 140 modifies or populates a particular resource (e.g., data field, register, parameter, setting, etc.) in the non-compiled resource information 122-1 as specified by the first rule with the corresponding data as specified by the network administrator 260. Thus, a network administrator 260 can modify an attribute of the non-compiled resource information in accordance as desired.

As another example, assume that the developer 208 produces a second rule (e.g., instruction) enabling a respective network administrator to specify a unique logo (e.g., image) that is to be displayed and/or associated with the subsequently installed application. The second rule may specify the location of an image file in the non-compiled resource information 122 that can be modified. In such an instance, the network administrator 260 would provide the data (i.e., appropriate image information such as in the form of a file) that is to be used with the second rule. Upon execution of the second rule and data, the customization engine 140 modifies or populates an appropriate location of the non-compiled resource information 122-1 with the image file (e.g., unique logo) as specified by the network administrator 260.

In this way, the rule creator such as the developer 208 can specify the possible rules for customizing a respective installation package; the network administrator 260 or other party defining customization can specify particular custom data that is to be used for the one or more rules when customizing the non-compiled resource information 122-1.

The collection manager 295 can receive the rules 211 from a rule creator via a network interface. For example, the collection manager 295 can be configured to serve a web page to the developer 208. The collection manager 295 receives the rules information and target information to which the rules apply from the developer 208 via input through the web page.

Via rules information generated by the rule creator, the collection manager 295 and/or other suitable resource provides an interactive interface such as a web interface enabling a respective party such as a network administrator 260 to input corresponding data that is to be used with the different rules supplied by the developer 208. In other words, via the interactive interface, the collection manager 295 notifies the network administrator 260 over network 191 of the rules and corresponding target resources to which the rules can be applied to customize the non-compiled resource information 122. The network administrator 260 provides the data for the rules to the interactive interface over network 191 to the collection manager 295. Thus, the collection manager 295 can be configured to use the interactive interface as a means to receive appropriate data from the network administrator 260 for the rules.

The customization engine 140 and/or other suitable resource can combine rules (as specified by the developer 208) and data (as specified by the network administrator 260) to create modification guidelines 110 that are substantially used to create customized installation packages.

In accordance with more advanced embodiments, note that the collection manager 295 or other suitable processing resource can be configured to analyze an installation package 120 to identify compiled executable code versus related software resources (e.g., non-compiled resource information) present in the received installation package 120. Based on the analysis, a processing resource such as the collection manager 295 provides notification to a network administrator 260 of the presence of the different software resources in the received installation package 120. In other words, the web page made available by the collection manager 295 to the network administrator can indicate which portions (e.g., files, pointers, etc.) in the default installation package 120 that can be modified to produce a respective customized installation package.

In one embodiment, the web page made available by the collection manager 295 to the network administrator 265 can include data fields, checkboxes, labels, etc., that are used by the network administrator 260 to indicate how to modify the default installation package 120. Thus, the collection manager 295 can provide notification of which specific portions of a default installation package 120 can be modified via the available rules as well as make it easy for a respective network administrator to input the data that are to be used to transform the default installation package 120 into respective one or more customized installation packages.

In accordance with embodiments herein, the default installation package 120 received by the customization engine 140 can enable installation of a respective software application to a particular type of computing device amongst multiple different types of computing devices. For example, a target computer device can be an Apple™ device; in this instance, the compiled resource information in the customized installation package includes one or more instructions that can be executed by the Apple™ device. A target computer device can be an Android™ device; in this instance, the compiled resource information in the customized installation package includes one or more instructions that can be executed by the Android™ device. A target computer device can be a Blackberry™ device; in this instance, the compiled resource information in the customized installation package includes one or more instructions that can be executed by the Blackberry™ device, and so on.

As mentioned above, the customization engine 140 performs the modification to the default installation package 120 such that the produced customized installation package(s) do not need to be recompiled prior to distribution to a respective destination such as network administrator or user. For example, as mentioned above, the received installation package 120 can include compiled code derived from source code 241. In accordance with embodiments herein, the customization engine 140 can include the same set of compiled code as that found in the initially default installation package 120. Because there is no modification of the compiled code when producing the customized installation package(s) 120-1, 120-2, etc., the customization engine 140 or other processing resource need not perform compilation of the source code 241. Because there is no recompilation needed, the developer of the respective application need not be involved in the customization process, other than perhaps supplying a set of rules enabling a respective network administrator to provide respective data specifying how to create customized installation packages as discussed above.

In certain embodiments, it may be desirable to configure the customization engine 140 to prevent modification of the compiled resource information 121.

In one embodiment, the set of rules 211 is combined with corresponding set of data 212. Thus, the rules 211 and corresponding data 212 can be combined into a single package (e.g., modification guidelines 110) if desired.

Figure 3:
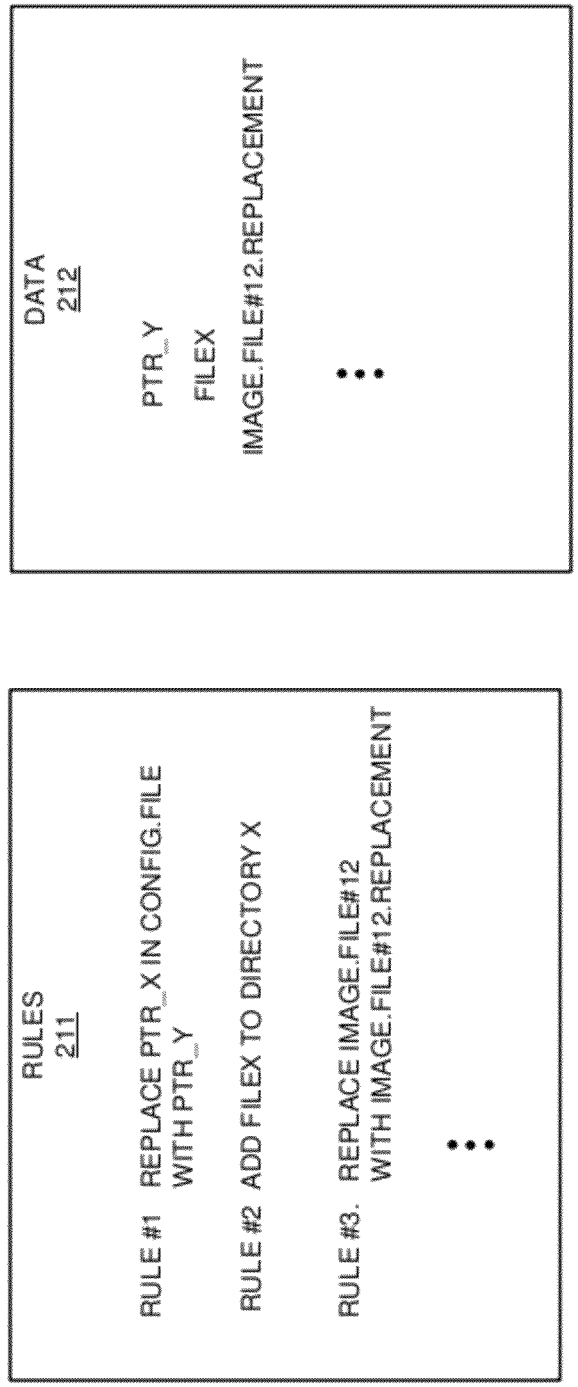
FIG. 3 is an example diagram illustrating sample rules and corresponding data according to embodiments herein.
Figure 4:
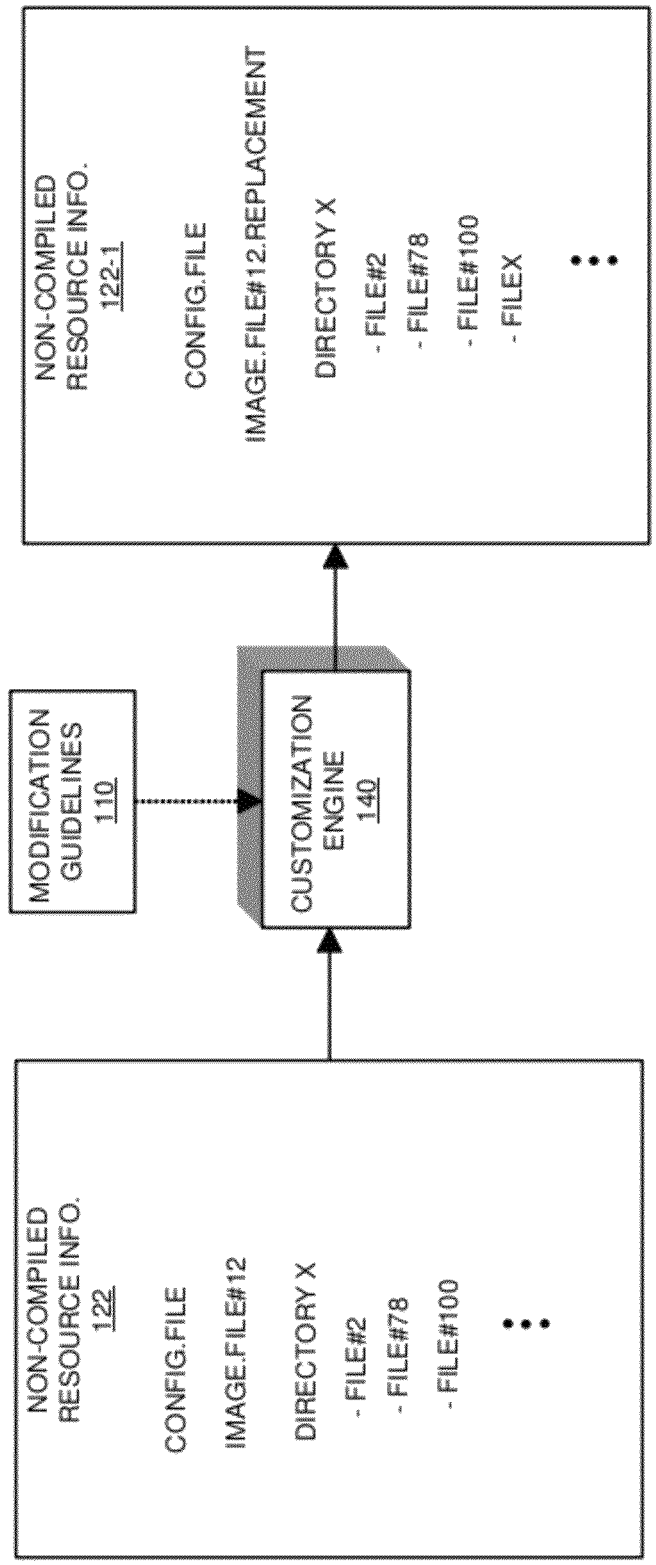
FIG. 4 is an example diagram illustrating modification of non-compiled resource information using the sample rules and corresponding data according to embodiments herein.

FIG. 3 is an example diagram illustrating combined rules and data according to embodiments herein. FIG. 4 is an example diagram illustrating use of the modification guidelines (e.g., rules and data) to produce a customized installation package according to embodiments herein.

Referring to FIG. 3, the set of rules 211 in this example specifies one or more particular functions or commands (e.g., copy, edit, replace, delete, . . . ) to be carried out with respect to the customization engine 140. The rules 211 can indicate how to modify any suitable resource in the non-compiled resource information 122.

In one embodiment, in accordance with instructions in the set of rules 211, the customization engine 140 uses the rules 211 and corresponding set of data 212 to transform the default installation package 120 into the customized installation package 120-1.

In this non-limiting example, the rule #1 in rules 211 informs the customization engine 140 to replace pointer X in CONFIG.FILE with the value pointer Y. The pointer Y may be any suitable value such as a uniform resource locator (a.k.a., URL) pointing to a mail server from which to retrieve e-mail information.

Further in this non-limiting example, rule #2 in rules 211 informs the customization engine 140 to add FILEX to directory X in the non-compiled resource information.

Rule #3 in rules 211 informs the customization engine 140 to replace IMAGE.FILE#12 in non-compiled resource information 122 with IMAGE.FILE#12.REPLACEMENT.

Note that this list of functions provided by rules 211 is not exhaustive of every possible rule that can be implemented to modify non-compiled resource information. For example, rules 211 can include delete functions, edit functions, move functions, copy functions, etc. Implementing edit functions may be useful when replacing or modifying text in configuration files. The edit functions may be especially useful when editing text in configuration files including XML information, properties information, Apple™ plist information, etc.

Referring now to FIG. 4, in accordance with one embodiment, to create the non-compiled resource information 122-1, the customization engine 140 makes a copy of the non-compiled resource information 122. Thereafter, the customization engine 140 executes the rules 211 on the copied information to produce the customized installation package 120-1.

In this non-limiting example, the customization engine 140 obtains an instruction (e.g., rule #1) from the set of rules 211. The customization engine 140 uses the rule to identify a resource to be modified.

For example, rule #1 in this example indicates to replace pointer X with pointer Y. The customization engine 140 searches the CONFIG.FILE for any instance of pointer X. The customization engine 140 obtains the value for pointer Y from data 212 and replaces the instances of pointer X in CONFIG.FILE with pointer Y. Thus, embodiments herein can include: identifying a resource (e.g., pointer, file, etc.) in the received installation package as specified by a rule; retrieving data from the set of data 212; and in accordance with the rule, swapping the identified resource in the non-compiled resource information 122 with the corresponding data 212 to produce the non-compiled resource information 122-1.

In the next step of this example, the customization engine 140 obtains the next instruction (e.g., rule #2) from the set of rules 211. The customization engine 140 uses the rule to identify a next modification operation. In this example, the rule #2 indicates to add FILEX to DIRECTORY X. The customization engine 140 searches the non-compiled resource information for directory X. The customization engine 140 retrieves FILEX from the data 212 and stores the FILEX in DIRECTORY X as specified by the rule #2.

In the next step, the customization engine 140 obtains the next instruction (e.g., rule #3) from the set of rules 211. The customization engine 140 uses the rule to identify a next modification operation. In this example, the rule #3 indicates to swap IMAGE.FILE#12 with IMAGE.FILE#12.REPLACEMENT. The customization engine 140 searches the data 212 for IMAGE.FILE#12.REPLACEMENT. The customization engine 140 retrieves IMAGE.FILE#12.REPLACEMENT from the data 212 as the substitute for IMAGE.FILE#12. The customization engine 140 swaps IMAGE.FILE#12 with IMAGE.FILE#12.REPLACEMENT. Thus, embodiments herein can include swapping a file in the default installation package with a file as specified by and provided by the network administrator.

The customization engine 140 repeats this process for each rule in order to produce non-compiled resource information 122-1 for inclusion in customized installation package 120-1.

As previously mentioned, the customization engine 140 can perform a unique set of rules for each target entity to which a customized installation package is directed.

As an example, a first set of data 212 including personal or specific configuration information associated with a first user can be used to generate non-compiled resource information 122-1; a second set of data 212 including personal or specific configuration information associated with a second user can be used to generate non-compiled resource information 122-2; and so on. Thus, based on personal configuration information associated with each of the target recipients (such as received from a network administrator 265), the customization engine 140 can produce different customized installation packages.

The embodiments as discussed above illustrate a way of formatting a REPLACE function (i.e., REPLACE IMAGE.FILE#12 WITH MAGE.FILE#12.REPLACEMENT in FIG. 3 during customization). Note that the format of the rules 211 and respective data 212 can vary depending on the embodiment.

For example, in one embodiment, the RULE #3 can be created by the developer 208 and formatted as follows:

RULE #3: ReplaceFile(IMAGE.FILE12.png, Y); where IMAGE.FILE12.png is a file in the non-compiled resource information 122; where parameter Y=placeholder name for new file to execute the replacement function.

RULE #3 can be presented to the network administrator 260 as a rule to potentially modify resource IMAGE.FILE12.png in the default installation package. The format of the RULE #3 provides guidance to a user as to what particular resource in the non-compiled resource information 122 can be modified. In this instance, the RULE #3 applies to performing a replace function with respect to the IMAGE.FILE#12.png in the non-compiled resource information 122. The resource IMAGE.FILE12.png may be a default image file present in the non-compiled resource information 122.

The respective data supplied by network administrator 260 for RULE #3 can be an image file as follows:

DATA: Y=IMAGE.FILE#12.REPLACEMENT.png (the network administrator 260 provides this replacement image file as input and sets Y=IMAGE.FILE#12.REPLACEMENT.png as the replacement file, the network administrator 260 also provides the actual image to replace the file IMAGE.FILE12.png,)

Figure 5:
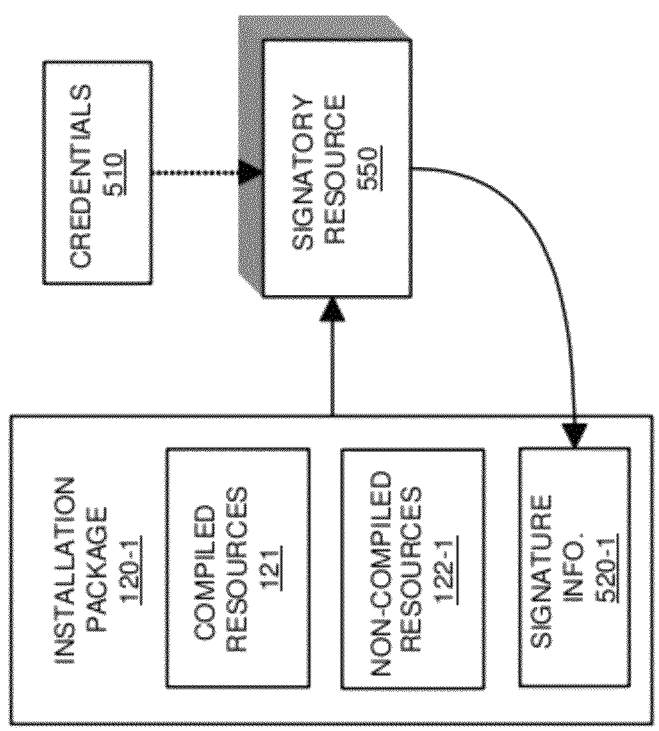
FIG. 5 is an example diagram illustrating signing of a customized installation package according to embodiments herein.

When the RULE #3 and corresponding data are executed by the customization engine 140, the customization engine 140 produces the non-compiled resource information 122-1 to include the IMAGE.FILE#12. REPLACEMENT instead of the default value FIG. 5 is an example diagram of signing a customized installation package according to embodiments herein.

As mentioned above, the installation package 120 received by the customization engine 140 can include multiple portions (e.g., compiled resource information and non-compiled resource information). The original installation package 120 may have been signed by an appropriate resource. Subsequent to implementing the modifications to create installation package 120-1, a signatory resource (e.g., certificate authority, customization engine 140, etc.) can re-sign the installation package 120-1 based on credentials 510. For example, the signatory resource 550 can be configured to utilize credentials 510 (e.g., a certificate, etc.) to produce signature information 520-1 based on the compiled resources and non-compiled resources 122-1. The signatory resource 550 signs the installation package 120-1 using signature information 520-1.

e Signing of the customized installation package 120-1 can help to prevent installation of malicious software on a user's computer device.

Figure 6:
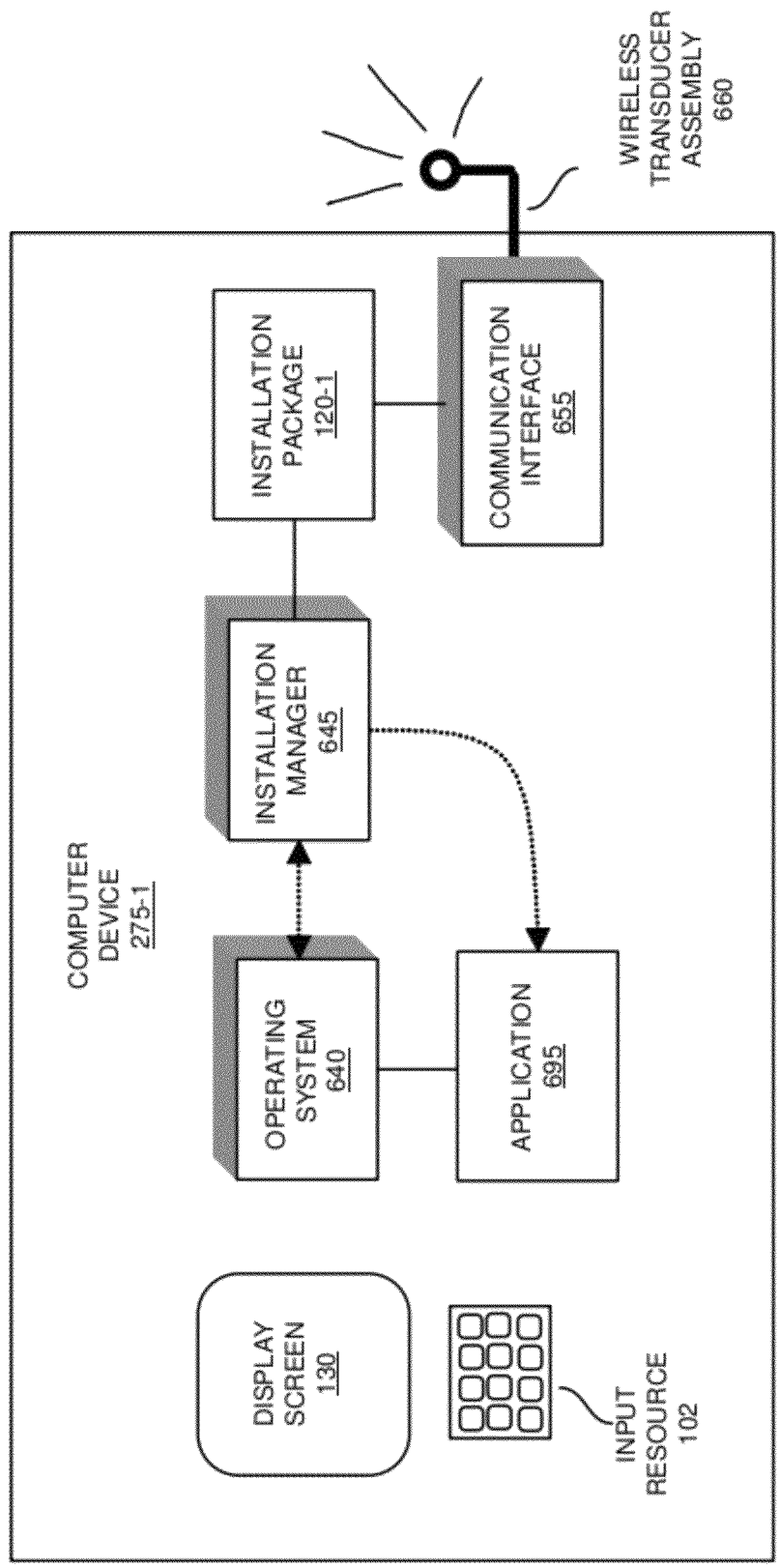
FIG. 6 is an example diagram illustrating a communication device and related components according to embodiments herein.

FIG. 6 is an example diagram illustrating an example communication device in which to install a customized application according to embodiments herein.

As shown, a target computer device 275-1 (e.g., a mobile device such as a handheld, portable communication device) can include a communication interface 655 to communicate with one or more remote devices in a network environment.

In this non-limiting example, the computer device 275-1 includes a wireless transducer assembly 660 in which to communicate over a wireless portion of network 191-3.

Via communication interface 655, the computer device 275-1 receives customized installation package 120-1 produced by customization engine 140. Based on input from a user operating computer device 275-1, the user initiates installation of the application 695 associated with the customized installation package 120-1 to computer device 275-1.

In one embodiment, the user provides input through input resource 102 to initiate execution of installation manager 645. Installation manager 645 can be a software functions included in customized installation package 120-1, operating system 640, or functions from a combination of both.

During installation, after verifying a signature (i.e., signature information 520-1) of the customized installation package 120-1, the installation manager 645 retrieves and copies information in the customized installation package 120-1 locally to the computer device 275-1.

For example, the installation manager 645 copies the compiled resource information 121 and non-compiled resource information 122-1 to the appropriate directory (or directories) in the computer device 275-1. The installed information can include any suitable information such as image information indicating how a corresponding icon associated with the application 695 is to appear on display screen 130, the text name of the application that appears beneath the icon, executable instructions to carry functionality associated with application 695, etc. The icon can be a symbol displayed on a springboard, menu, desktop, etc.

As previously discussed, the customized installation package 120-1 can include custom information tailored for a respective user. For example, by way of a non-limiting example, the application 295 being installed via execution of customized installation package 120-1 can be an e-mail management application.

To reference custom modifications as previously discussed, the pointer Y included in the CONFIG.FILE can be a specific network address (of a mailbox) from which to retrieve e-mails associated with the user of computer device 275-1. The IMAGE.FILE#12 may be a default image representing a selectable icon to be displayed by the operating system 640 on the display screen 130. The IMAGE.FILE#12.REPLACEMENT, that is replacing IMAGE.FILE#12, is a custom image representing a selectable icon to be displayed by the operating system 640 on the display screen 130 for the application 295 in lieu of the default icon associated with IMAGE.FILE#12. As mentioned, selection of the displayed icon (e.g., symbol represented by IMAGE.FILE#12.REPLACEMENT) on the display screen 130 invokes execution of executable instructions associated with the application 295.

Thus, via application of rules 211, the customization engine 140 alters at least a portion of received installation package 120 to configure the customized installation package 120-1 to provide unique functionality (e.g., visual settings, functional settings, etc.) functionality upon execution of the installed application 695.

Thus, during generation of the customized installation package 120-1, the customization engine 140 can identify a portion of the received installation package to modify as indicated by a rule; the identified portion of the received installation package can define a first display symbol (e.g., default display symbol) to be displayed as a visual symbol indicating availability of the application 695 for execution. In accordance with the rule, the customization engine 140 alters the identified portion of the received installation package 120. The altered portion included in the customized installation package 120-1 defines a second display symbol (e.g., custom symbol associated with the user of the computer device 275-1) to be displayed in lieu of displaying the first (default) symbol.

Figure 7:
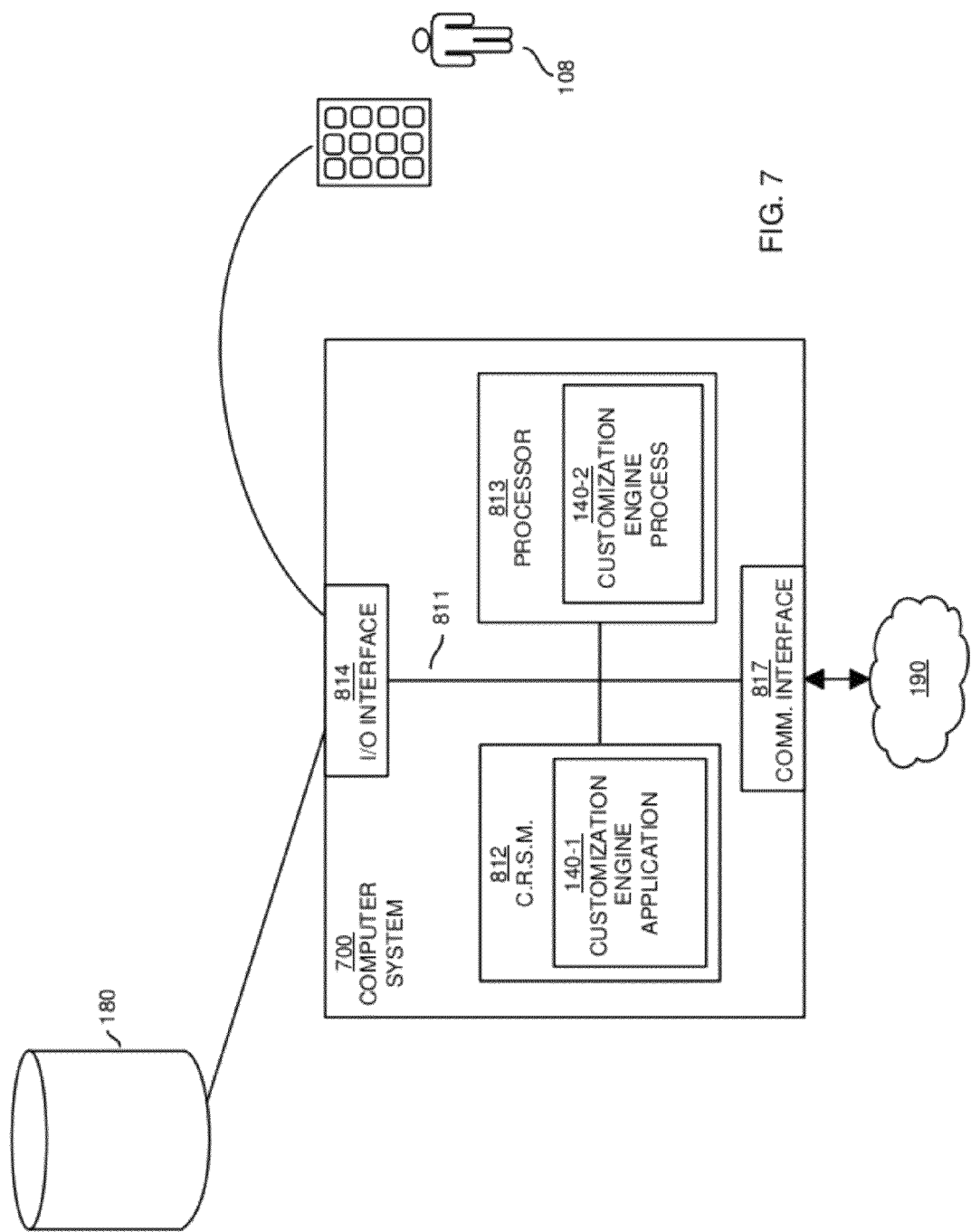
FIG. 7 is an example diagram illustrating an example computer architecture for implementing functionality according to embodiments herein.

FIG. 7 is an example block diagram of a computer hardware system for executing operations according to embodiments herein. Any of the functionality and/or resources as discussed herein executed with computer system 700 or the like to perform functionality as discussed herein.

Computer system 700 (e.g., computer hardware, software, etc.) can be or include one or more computerized devices such as a personal computer, workstation, portable computing device, mobile device, handheld device, console, network terminal, processing device, network device, etc.

Note that the following discussion provides a basic embodiment indicating how to execute functionality according to embodiments herein using a computer system. However, it should be noted that the actual configuration for carrying out the operations as described herein can vary depending on a respective application.

As shown, computer system 700 of the present example includes an interconnect 811 that couples computer readable hardware storage media 812 (i.e., a non-transitory type of computer readable storage media) in which digital information can be stored and/or retrieved, a processor device 813, I/O interface 814, a communications interface 817, etc.

I/O interface 814 provides connectivity to different resources such as a repository, display screen, keyboard, computer mouse, etc.

Computer readable storage medium 812 can be any suitable device such as memory, optical storage, hard drive, floppy disk, etc. In one embodiment, the computer readable storage medium 812 is a non-transitory computer readable storage media (e.g., any hardware storage media) to store instructions and/or data.

Communications interface 817 enables the computer system 700 and processor device 813 to communicate over a network 190 to retrieve information from remote sources and communicate with other computers. I/O interface 814 enables processor device 813 to retrieve respective information from a repository.

As shown, computer readable storage media 812 can be encoded with customization engine application 140-1 (e.g., software, firmware, etc.) executed by processor 813.

During operation of one embodiment, processor device 813 (e.g., one or more computer devices) accesses computer readable storage media 812 via the use of interconnect 811 in order to launch, run, execute, interpret or otherwise perform the instructions of customization engine application 140-1 stored on computer readable storage medium 812. Customization engine application 140-1 can include appropriate instructions, logic, etc., to carry out any or all functionality associated with the resources (e.g., clients, servers, notification network, network administrator, etc.) in a computer network environment as discussed herein.

Execution of the customization engine application 140-1 produces processing functionality such as software process 140-2 in processor device 813. In other words, the customization engine process 140-2 associated with processor device 813 represents one or more aspects of executing customization engine application 140-1 within or upon the processor device 813 in the computer system 700.

Those skilled in the art will understand that the computer system 700 can include other processes and/or software and hardware components, such as an operating system that controls allocation and use of hardware resources to execute customization engine application 140-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, portable handheld device, video game console, handheld video game device, a peripheral device such as a switch, modem, router, or in general any type of computing or electronic device.

Functionality supported by resources in network environment and resources therein will now be discussed via flowcharts in FIGS. 8-10. Note that there will be some overlap with respect to concepts discussed above for FIGS. 1 through 7. Also, note that the steps in the below flowcharts need not always be executed in the order shown. That is, the steps can be executed in any suitable order.

Figure 8:
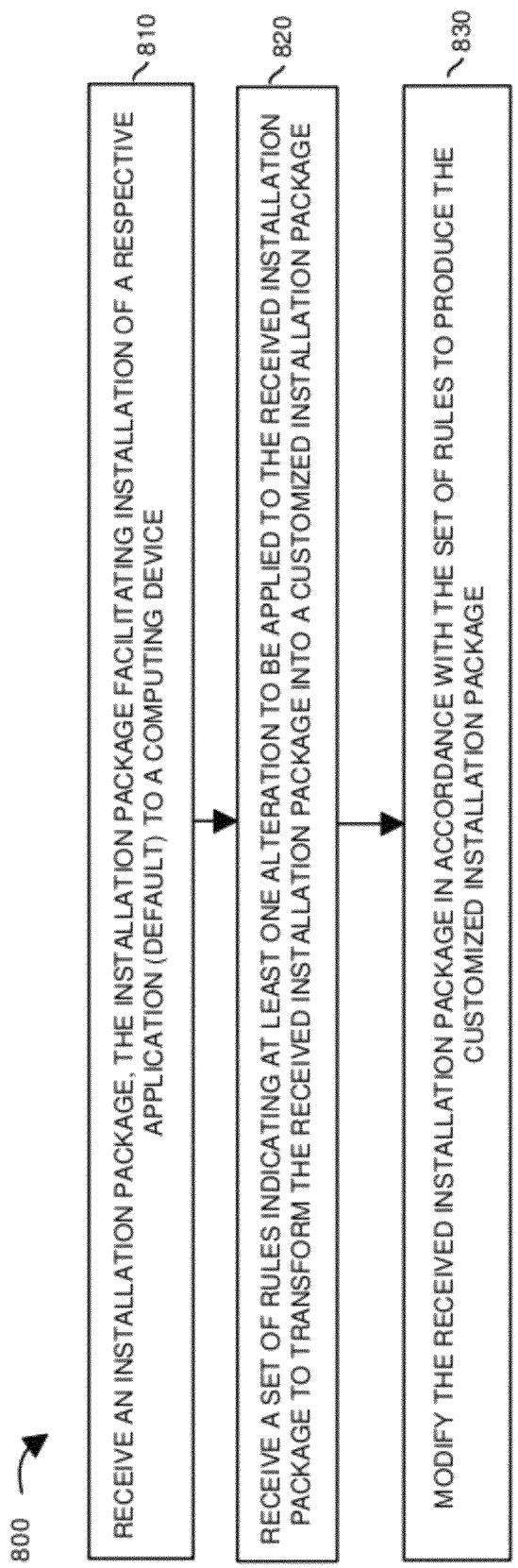
FIG. 8 is a flowchart illustrating an example method of generating one or more customized installation packages according to embodiments herein.

FIG. 8 is a flowchart 800 illustrating a general technique of utilizing configuration information according to embodiments herein.

In step 810, the customization engine application 140-1 receives an installation package 120; the installation package 120 facilitates installation of a respective application 295 to a computing device 275-1.

In step 820, the customization engine application 140-1 receives a set of rules 211 indicating at least one alteration to be applied to the received installation package 120 to transform the received installation package 120 into a customized installation package 120-1.

In step 830, the customization engine application 140-1 modifies the received installation package 120 in accordance with the set of rules 211 and corresponding data 212 to produce the customized installation package 120-1.

As mentioned above, the customization engine 140 can repeat this process to generate customized installation packages for each of multiple target recipients.

Figure 9:
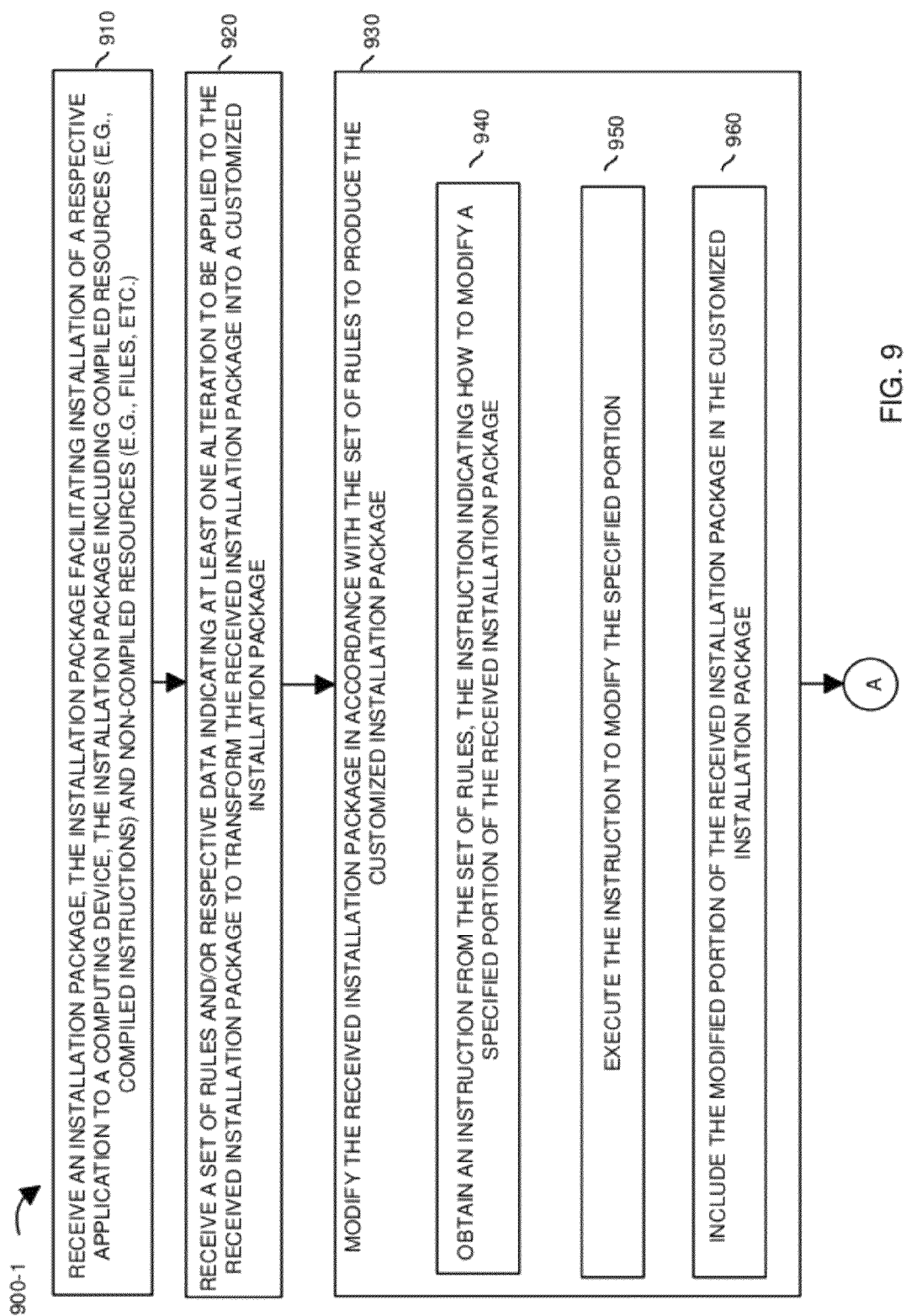
FIGS. 9 and 10 combine to form a flowchart illustrating generation of one or more customized installation packages according to embodiments herein.
Figure 10:
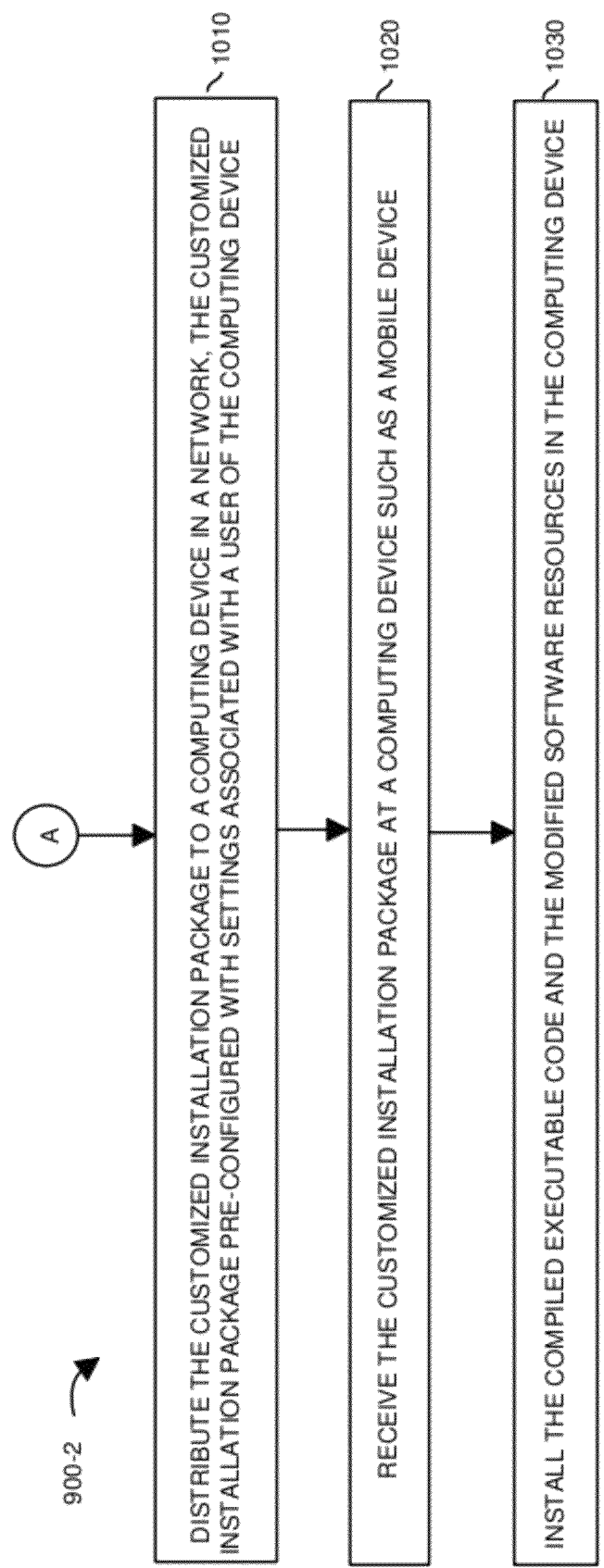

FIGS. 9 and 10 combine to form a flowchart 900 (e.g., flowchart 900-1 and flowchart 900-2) illustrating a more detailed method of provisioning according to embodiments herein.

In step 910, the customization engine application 140-1 receives an installation package 120; the installation package 120 facilitates installation of a respective application to a computing device according to a default setting. The installation package 120 includes compiled resources (e.g., compiled instructions) and non-compiled resources (e.g., files, etc.).

In step 920, the customization engine application 140-1 receives modification guidelines 110 including a set of rules 211 and/or respective data 212 indicating at least one alteration to be applied to the received installation package 120 to transform the received installation package 120 into one or more customized installation packages.

In step 930, the customization engine application 140-1 modifies the received installation package 120 in accordance with the modification guidelines 110 to produce the customized installation package 120-1.

In sub-step 940, the customization engine application 140-1 obtains an instruction from the set of rules 211, the instruction indicates how to modify a specified portion of the received installation package 120.

In sub-step 950, the customization engine application 140-1 executes the instruction to modify the specified portion.

In sub-step 960, the customization engine application 140-1 includes the modified portion of the received installation package 120 in the customized installation package 120-1.

In step 1010 in FIG. 10, the customization engine application 140-1 or other suitable resource distributes the customized installation package 120-1 to a computing device 275-1 in a network. The customized installation package 120-1 is pre-configured with settings associated with a user of the computing device 275-1.

In step 1020, the computer device 275-1 receives the customized installation package 120-1.

In step 1030, the computer device 275-1 installs the compiled executable code (e.g., compiled resource information 121) and the modified software resources (e.g., non-compiled resource information 122-1) on the computing device 275-1.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   receiving an installation package, the installation package being executable to install a respective application onto a computing device;
   receiving a set of rules indicating at least one alteration to be applied to non-compiled configuration information in the received installation package to transform the received installation package into a customized installation package, the non-compiled configuration information specifying how to customize the respective application during installation, the at least one alteration specifying replacement of a first software resource with a second software resource; and
   modifying the received installation package in accordance with the set of rules to convert the received installation package into the customized installation package, the customized installation package executable to perform a custom installation of the respective application on the computing device on behalf of a user of the computing device; and
   forwarding the customized installation package for distribution to the computing device.

2. The method as in claim 1, wherein the installation package includes: a set of compiled instructions to execute the respective application; and
   wherein modifying the received installation package includes:
      retrieving the set of compiled instructions from the received installation package;
      including an unmodified version of the set of compiled instructions in the customized installation package;
      modifying the non-compiled configuration information in a manner as specified by the set of rules; and
      including the modified non-compiled configuration information in the customized installation package to create the customized installation package.

3. The method as in claim 2, wherein the computing device is a mobile computing device; and
   wherein forwarding the customized installation package includes:
      distributing the customized installation package to the mobile computing device, the mobile computing device present in a wireless network, the customized installation package pre-configured with settings associated with the user of the mobile computing device, the modified non-compiled configuration information including the settings associated with the user.

4. The method as in claim 1 further comprising:
   receiving a set of data associated with the set of rules; and
   in accordance with instructions in the set of rules, using the set of data to transform the received installation package into the customized installation package.

5. The method as in claim 4, wherein modifying the received installation package in accordance with the rule includes:
   identifying a location of the first software resource in the received installation package, the first software resource specified by a rule;
   retrieving the second software resource from the set of data, the retrieved second software resource specified by the rule; and
   in accordance with the rule, swapping the first software resource in the received installation package with the second software resource to produce the customized installation package.

6. The method as in claim 1, wherein modifying the received installation package in accordance with the set of rules includes:
   obtaining an instruction from the set of rules, the instruction indicating how to modify a specified portion of the received installation package;
   executing the instruction to modify the specified portion; and
   including the modified portion of the received installation package in the customized application.

7. The method as in claim 1, wherein the received installation package includes multiple portions, at least one of the multiple portions in the received installation package being original signature information derived from selected portions in the received installation package, the original signature information assigned to and included in the received installation package, the method further comprising:
   deriving new signature information based on portions in the customized installation package; and
   signing the customized installation package with the new signature information.

8. The method as in claim 1 further comprising:
   initiating distribution of a graphical user interface to an entity at a remote location over a network; and
   via input to the graphical user interface at the remote location, receiving data associated with the set of rules to convert the received installation package into the customized installation package.

9. The method as in claim 1, wherein modifying the received installation package includes:
   altering at least a portion of the received installation package to configure the customized installation package to provide unique display functionality upon execution of the respective application.

10. The method as in claim 1, wherein modifying the received installation package includes:
  identifying a portion of the received installation package to modify as indicated by a rule, the portion of the received installation package defining a first display symbol to be displayed as a visual symbol indicating availability of the application for execution; and
  in accordance with the rule, altering the portion of the received installation package, the altered portion defining a second display symbol to be displayed in lieu of displaying the first symbol.

11. The method as in claim 1, wherein the received installation package includes compiled executable code derived from source code and software resources used by the compiled executable code;
  wherein modifying the received installation package includes:
    modifying the software resources in accordance with the set of rules to include the second software resource in lieu of the first software resource; and
    including the compiled executable code and the modified software resources in the customized installation package.

12. The method as in claim 11 further comprising:
  producing signature information based on the compiled executable code and the modified software resources; and
  including the signature information in the customized installation package.

13. The method as in claim 12, wherein the computing device is a mobile device, the method further comprising:
  at the mobile device:
    receiving the customized installation package; and
    installing the compiled executable code and the modified software resources to the mobile device.

14. The method as in claim 1 further comprising:
  analyzing the received installation package to identify compiled executable code and software resources in the received installation package;
  providing notification to an administrator of the software resources in the received installation package, the notification indicating portions of the software resources that can be modified; and
  receiving the set of rules from the administrator.

15. A computer hardware system comprising:
  at least one processor device;
  a hardware repository that stores instructions associated with an application executed by the at least one processor; and
  an interconnect coupling the processor and the hardware repository, the interconnect causing the at least one application to execute the application and perform operations of:
    receiving an installation package, the installation package executable to install a respective application onto a computing device;
    receiving a set of rules indicating at least one alteration to be applied to non-compiled configuration information in the received installation package to transform the received installation package into a customized installation package, the non-compiled configuration information specifying how to customize the respective application during installation, the at least one alteration specifying replacement of a first software resource with a second software resource;
    modifying the received installation package in accordance with the set of rules to produce the customized installation package, the customized installation package executable to perform a custom installation of the respective application on the computing device on behalf of a user of the computing device; and
    forwarding the customized installation package for distribution to the computing device.

16. The computer hardware system as in claim 15, wherein the installation package includes a set of compiled instructions to execute the respective application.

17. The computer hardware system as in claim 16, wherein the at least one processor device further supports operations of:
  distributing the customized installation package to a handheld mobile computing device in a wireless network, the non-compiled configuration information in the customized installation package pre-configured with settings associated with a user of the handheld mobile computing device.

18. The computer hardware system as in claim 15, wherein the at least one processor device further supports operations of:
  receiving a set of data associated with the set of rules;
  in accordance with instructions in the set of rules, using the set of data to transform the received installation package into the customized installation package; and
  wherein modifying the received installation package in accordance with the rule includes: identifying a resource in the received installation package as specified by a rule; retrieving data from the set of data, the retrieved data specified by the rule; and in accordance with the rule, swapping the identified resource in the received installation package with the data to produce the customized installation package.

19. The computer hardware system as in claim 15, wherein modifying the received installation package in accordance with the set of rules includes:
  obtaining an instruction from the set of rules, the instruction indicating how to modify a specified portion of the received installation package; and
  executing the instruction to modify the specified portion; and
  including the modified portion of the received installation package in the customized application.

20. The computer hardware system as in claim 15 further supporting operations of:
  deriving signature information based on portions in the customized installation package; and
  signing the customized installation package with the signature information.

21. The computer hardware system as in claim 20, wherein the at least one processor device further supports operations of:
  initiating distribution of a graphical user interface to an entity at a remote location over a network;
  via input to the graphical user interface at the remote location, receiving the set of rules to convert the received installation package into the customized installation package; and
  wherein modifying the received installation package includes: altering at least a portion of the received installation package to configure the customized installation package to provide unique display functionality upon execution of the respective application.

22. The computer hardware system as in claim 15, wherein modifying the received installation package includes:
  identifying a portion of the received installation package to modify, as indicated by a rule, the portion of the received installation package defining a first display symbol to be displayed as a visual symbol indicating availability of the respective application for execution; and in accordance with the rule, altering the portion of the received installation package, the altered portion defining a second display symbol to be displayed in lieu of displaying the first symbol.

23. The computer hardware system as in claim 15, wherein the received installation package includes compiled executable code derived from source code and software resources used by the compiled executable code; and wherein modifying the received installation package includes:

modifying the software resources in accordance with the set of rules; and including the compiled executable code and the modified software resources in the customized installation package.

24. The computer hardware system as in claim 23, wherein the at least one processor device further supports operations of:

producing signature information based on the compiled executable code and the modified software resources; and including the signature information in the customized installation package.

25. The computer hardware system as in claim 15, wherein the at least one processor device further supports operations of:

analyzing the received installation package to identify compiled executable code and software resources in the received installation package;

providing notification to an administrator of the software resources in the received installation package, the notification indicating portions of the software resources that can be modified; and receiving the set of rules from the administrator.

26. A non-transitory computer-readable medium having instructions stored thereon for processing data information, such that the instructions, when carried out by at least one processing device, cause the at least one processing device to perform operations of:

receiving an installation package, the installation package executable to install a respective application onto a computing device;

receiving a set of rules indicating at least one alteration to be applied to non-compiled configuration information in the received installation package to transform the received installation package into a customized installation package, the non-compiled configuration information specifying how to customize the respective application during installation, the at least one alteration specifying replacement of a first software resource with a second software resource;

modifying the received installation package in accordance with the set of rules to produce the customized installation package, the customized installation package executable to perform a custom installation of the respective application on the computing device on behalf of a user of the computing device; and forwarding the customized installation package for distribution to the computing device.

27. The method as in claim 1 further comprising:

from a first party, receiving a given rule specifying a target resource in the received installation package;

presenting the rule to a second party, the second party defining how to produce the customized installation package;

receiving data associated with the given rule from the second party; and producing the customized installation package to include a modification to the target resource as specified by the given rule and the received data.

28. The computer hardware system as in claim 15, wherein the at least one processor device further supports operations of:

from a first party, receiving a given rule specifying a target resource in the received installation package;

presenting the rule to a second party, the second party defining how to produce the customized installation package;

receiving data associated with the given rule from the second party;

producing the customized installation package to include a modification to the target resource as specified by the given rule and the received data.

29. The method as in claim 1, wherein the customized installation package is executable on the computing device to provide custom installation of the respective application on the computing device in a manner as specified by the set of rules.

30. The method as in claim 1, wherein forwarding the customized installation package includes:

initiating transmission of the customized installation package to the computing device for execution, execution of customized installation package providing custom installation of the respective application on the computing device in a manner as specified by the set of rules.

31. The method as in claim 1, wherein the operation of modifying the received installation package occurs prior to transmission and execution of the customized installation package on the computing device to install the respective application.

32. The method as in claim 2, wherein modifying the non-compiled configuration information in a manner as specified by the set of rules includes: as specified by the set of rules, modifying the non-compiled configuration information to include custom configuration settings for the user.

33. The method as in claim 32, wherein the modified non-compiled configuration information represents configuration settings generated for the user indicating how to customize the respective application on behalf of the user.

34. The method as in claim 32, wherein the modified non-compiled configuration information represents configuration settings generated for the user indicating how to customize the respective application upon installation of the respective application on the computing device via execution of the customized installation package.

35. The computer hardware system as in claim 15, wherein the received installation package includes executable code and default settings information for use by the executable code to install the respective application in accordance with default settings; and wherein the customized installation package includes the executable code and corresponding custom settings information for use by the executable code to install the respective application in accordance with custom settings generated for the user of the computing device.

* * * * *